UNITED STATES PATENT OFFICE.

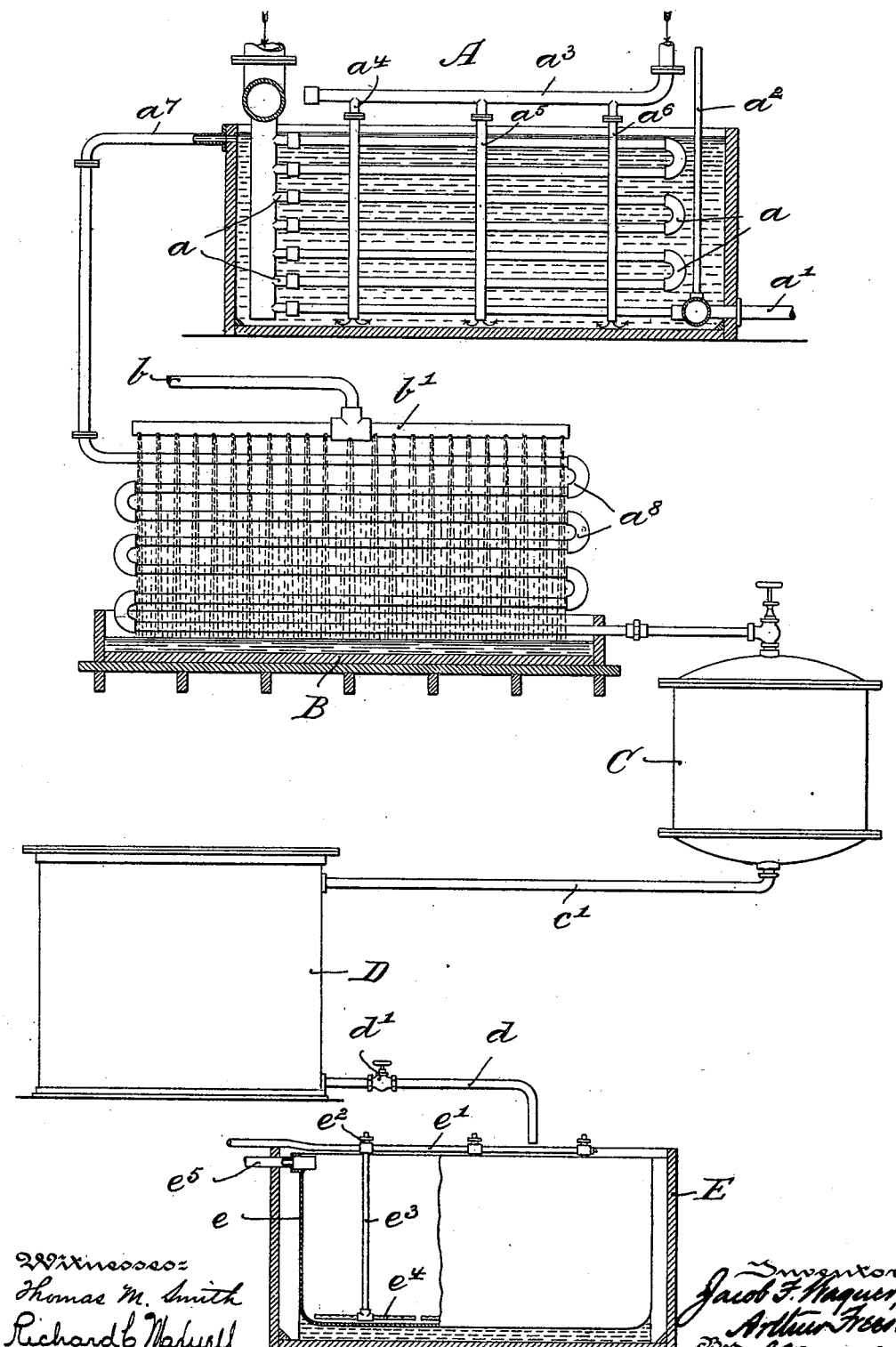

JACOB F. WAGNER AND ARTHUR FREESTON, OF PHILADELPHIA, PENNSYLVANIA, ASSIGNORS TO THE ICE MANUFACTURING COMPANY OF GERMANTOWN, OF SAME PLACE.

METHOD OF MANUFACTURING ICE.

SPECIFICATION forming part of Letters-Patent No. 641,742, dated January 23, 1900.

Application filed August 16, 1899. Serial No. 727,346. (No specimens.)

*To all whom it may concern:*

Be it known that we, JACOB F. WAGNER and ARTHUR FREESTON, citizens of the United States, residing at Philadelphia, (Germantown,) in the county of Philadelphia and State of Pennsylvania, have invented certain new and useful Improvements in Methods of Manufacturing Ice, of which the following is a specification.

Our invention has relation to improvements in the method of producing ice in plate or block form in a pure state and without air-needles and internal honeycomb conditions.

Plate or block ice has hitherto been produced by passing water from a suitable source of supply through filtering media to liberate impurities therefrom and then conducting to a freezing-tank, in which to drive off air and gases the water therein was either set in circulation by a pump or by mechanical means, such as paddles or the like, or by cold air forced through the water during the freezing operation. In such manner the air and gases have been very imperfectly driven off and the plates or blocks of ice were not of uniform thickness and quality, for the reason that a uniform circulation could not be insured throughout the entire body of water during the freezing into ice to liberate entirely the air and gases, so that air-needles were bound to be formed in the plates or blocks, thus to become receptacles for dirt and dust in handling, thereby lessening the value, as well as usefulness, of the ice. Aside from the poor quality of the ice so produced, the freezing was naturally retarded, due to the agitation, as well as considerable loss in effect of the freezing medium, as brine or ammonia, since the cold water, which must be kept in circulation, became heated in its travel to the pump and in passing through the same. If air is employed for agitating the water to liberate air and gases therefrom, the air must first be cooled before entering the water, and a pump is required to force the air through the same into the freezing-tank. This also involves a considerable loss in the refrigerant effect through the absorption by the air of heat due to radiation or friction. Then considerable power is required to force air or water continuously through a body of water to keep the same agitated by the air or stream of water, or when paddles or the like are employed this is equally true. After the block or plate of ice was removed from the freezing-tank the remaining cool or refrigerant water—that is, the body or volume of water between the plates or blocks formed—was discharged into a sewer or other waste-receptacle, being surcharged with the air and noxious gases given off in the freezing of the water into the plates or blocks of ice in the tank, therefore unfit for subsequent use. A direct loss of a really otherwise valuable body of water was thereby incurred, that might under other conditions be utilized, and especially as the temperature of the water has been brought by the refrigerating media to a condition to be readily converted into ice were it not for the fact that the aforesaid impurities were carried into and retained therein.

The principal object of our present invention is to overcome the disadvantages of the method of making plate or block ice as hereinbefore defined and to provide a method whereby plate or block ice can be more solidly, cheaply, and far more quickly produced in a pure condition—that is, free from air-needles and impurities.

Our invention consists, first, in the method of making plate or block ice, in conducting water from a suitable source of supply into an open tank in which are located steam-coils and through which steam or heated air is conveyed for heating, by radiation, the water maintained in the tank in a more or less quiescent state to about 190° Fahrenheit to liberate the air and gases contained therein from the water in the tank. The body of water so freed from air and noxious gases in the tank is then conducted from the open tank through coils subjected to a cooling agent, as cold water, to lower the temperature, and after having been cooled this water is conveyed to a filter to remove impurities still remaining therein, and from thence it is preferably discharged into a collecting-tank and from which it is conducted into the freezing-tank, provided with the usual freezing plates and cells, and in which tank the water remaining at rest or in a quiescent state is rapidly frozen from the walls of the freezing plates or cells progressively toward a vertical median plane through the body of water therein, with a certain portion—about one-fourth of the space between the plates or cells—left free in the formation of the blocks or plates of ice therein, and in this space all air, gases, and other impurities which have found their way into the freezing-tank accumulate. The quantity of air and gases remaining, due to their liberation from the water previous to the discharge of the same into the freezing-tank, is so small that the body of remaining water is not removed from the tank, but utilized for the next freezing operation to save refrigerant effect upon water introduced to lower its temperature and to shorten the time for refilling the tank, and, further, through the absence of agitation of the water in the freezing-tank the formation of the ice in said tank is considerably accelerated and the plate or block of ice formed is of a more uniform thickness and free from air-needles and impurities.

The nature and scope of our invention will be more fully understood from the following description, taken in connection with the accompanying drawing, forming part hereof, illustrating in section and in elevation a plant for the conduct of the method of our invention.

Referring to the drawing, A is a fluid-tank provided with several series of heating-coils $a$, through which steam or heated air is conveyed and circulated.

$a'$ is the outlet-pipe for the discharge of condensed steam, live or exhaust, and $a^2$ is a small blow-off pipe.

$a^3$ is a water-inlet main, and $a^4$, $a^5$, and $a^6$ are branch pipes leading therefrom for discharging the water into the bottom of the open tank, so as to rise gently and without agitation therein and be discharged from the tank through the pipe $a^7$, the extension of which is formed into coils $a^8$.

The open tank A, by the circulation of steam or heated air permitted through the series of coils $a$, raises the temperature of the water rising in the tank A and maintained therein in substantially a quiescent state to about 190° Fahrenheit to insure the liberation of air and noxious gases from the water and to prevent the boiling of the water, which would tend to agitate the same.

$b$ is a water-supply main located above a cooling-tank B.

$b'$ is a union perforated pipe connection, through the perforations of which connection the water from a suitable source of supply, passing through the pipes $b$ and $b'$, by falling cools off the water in passage through the coils $a^8$ and from which the water thus cooled and free of air and noxious gases is conducted through an appliance C, containing filtering media, wherein all impurities are removed, and it then is conveyed by pipe connection $c'$ into a reservoir D, supplying in a purified condition the water to the ice-forming tanks E through the pipe connection $d$, provided with a stop-cock $d'$. These tanks E are generally arranged in series and provided with oblong cells $e$.

$e'$ is a pipe connection provided with vertical branches $e^3$, depending therefrom and terminating in a longitudinal perforated extension $e^4$, located near the bottom on the interior of each cell, through which perforations the brine or other refrigerating media is permitted to rise in the cells and exert its influence by the chilling and freezing of the walls of the cell to cause from both sides the freezing progressively of the water into oblong plates or blocks of ice toward a vertical median plane of the body of water in each tank E, maintained in a quiescent state freed of impurities, air, and noxious gases and without the body internally being honeycombed or of the formation of air-needles to become receptacles for dust and dirt in the handling of the ice, which thereby greatly depreciates the value and usefulness of the ice.

$e^5$ is an exit-pipe for the brine or ammonia from each cell of the tank E.

By the foregoing treatment of the water—that is, progressively heating, cooling, and filtering the same—it is brought into the best possible condition for making plate or block ice when discharged into the refrigerant-tanks and allowed to remain during the heating as well as freezing operations in a quiescent state or condition. The body of water left between the two blocks or plates of ice formed in the tank, being about one-fourth of the entire volume thereof, is, after removal of the said plates or blocks in any preferred manner, allowed to remain, because of its availability and suitability for reducing quickly and effectively a fresh supply of purified water to the tanks to replace the removed plates or blocks of ice, and not, as hitherto, is it discharged into a sewer. This has been a desideratum in the past and an expense which it has been highly desirable to overcome—that is, the discharge of the tempered water containing impurities liberated into the same in the formation of the ice; but practice has demonstrated that it was essential for the sale of the ice made to rid each tank after the plates or blocks of ice were formed and removed of the contaminated lower-temperatured water and also to thoroughly cleanse the tanks before supplying the same with fresh filtered water for another freezing operation, yet each time with the loss of a large quantity in which energy had been expended in tempering and which, if available, would expedite the freezing of fresh water to the tank, owing to the lower temperature of such water and its capacity to impart its effect quickly to the fresh supply to hasten freezing of the entire body of water in the tank into ice. This by our invention we accomplish and in a most satisfactory practical manner when carried out in substantially the manner hereinbefore explained into an ice in plate or block form in a pure and transparent or clear condition without being honeycombed internally and without air-needles or gases therein for becoming receptacles for extraneous matter or particles in the handling of the ice, as well as by their presence hastening melting of the ice, especially when the ice is made in one season and stored for subsequent use.

Having thus described the nature and objects of our invention, what we claim as new, and desire to secure by Letters Patent, is—

The herein-described method of making plate or block ice, which consists in introducing water into an open vessel, passing a heating media through the body of water maintained in a substantially quiescent state in said vessel and in a direction opposite to the introduction of the water into said vessel, discharging the water in its hottest condition from said vessel, cooling the water in transit without agitation of the same, liberating impurities from the volume of cooled water without coming into contact with atmospheric air and then freezing the water maintained in a quiescent state progressively into ice toward a median plane of the body of such treated water, substantially as and for the purposes described.

In testimony whereof we have hereunto set our signatures in the presence of two subscribing witnesses.

JACOB F. WAGNER.
ARTHUR FREESTON.

Witnesses:
J. WALTER DOUGLASS,
RICHARD C. MAXWELL.